No. 713,984. Patented Nov. 18, 1902.
R. F. HEILES.
BOOKKEEPING BOOK.
(Application filed Apr. 19, 1900.)
(No Model.) 2 Sheets—Sheet 1.
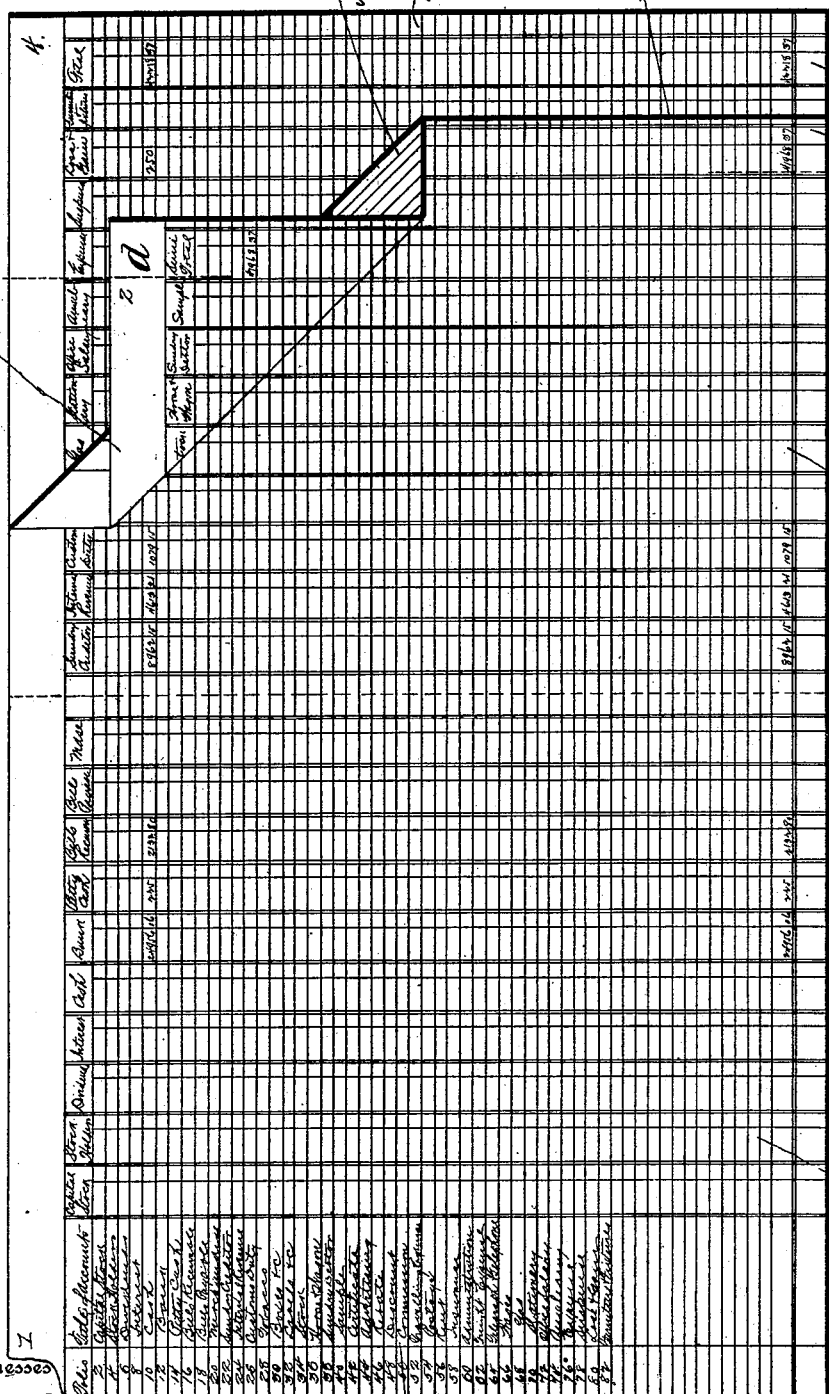
Witnesses
T. L. Mockam
Flora Pierce.
Inventor
R. F. Heiles
By T. W. Johnson, Attorney.
THE NORRIS PETERS CO., PHOTO-LITHO., WASHINGTON, D. C.

No. 713,984. Patented Nov. 18, 1902.
R. F. HEILES.
BOOKKEEPING BOOK.
(Application filed Apr. 19, 1900.)
(No Model.) 2 Sheets—Sheet 2.
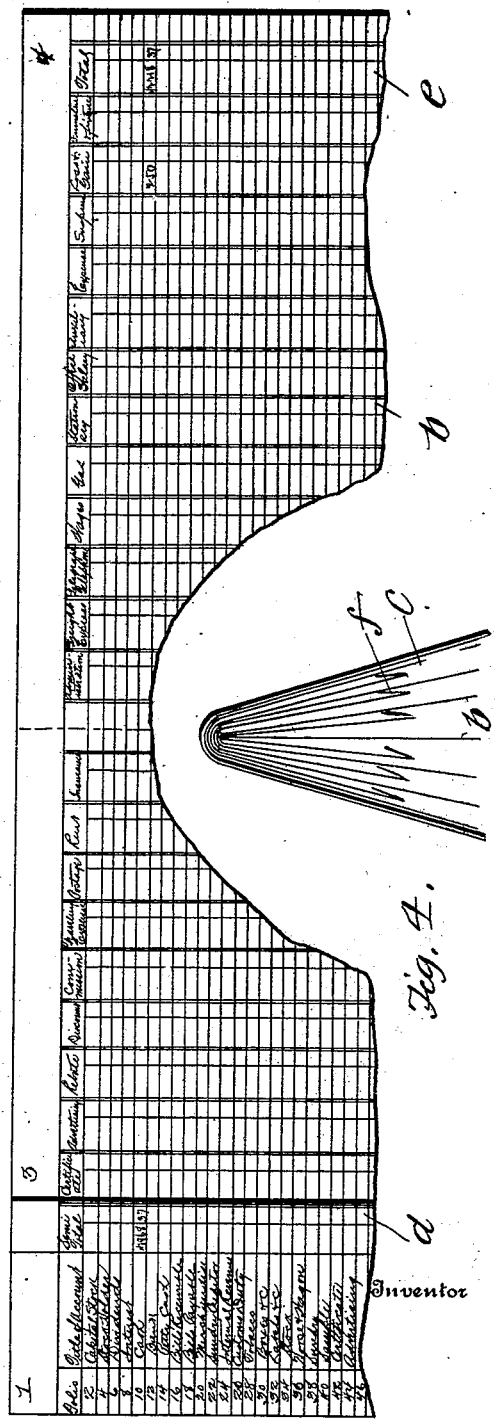
Witnesses
G. L. Newhen
Flora Pierce.
Inventor
R. F. Heiles
By T. W. Johnson
Attorney.

UNITED STATES PATENT OFFICE.

RUDOLPH F. HEILES, OF NEWARK, NEW JERSEY.

BOOKKEEPING-BOOK.

SPECIFICATION forming part of Letters Patent No. 713,984, dated November 18, 1902.

Application filed April 19, 1900. Serial No. 13,451. (No model.)

*To all whom it may concern:*

Be it known that I, RUDOLPH F. HEILES, a citizen of the United States, residing at Newark, in the county of Essex and State of New Jersey, have invented certain new and useful Improvements in Bookkeeping-Books; and I do hereby declare the following to be a full, clear, and exact description of the invention, such as will enable others skilled in the art to which it appertains to make and use the same.

My invention relates to improvements in bookkeeping-books, and more particularly to journals such as I designate "condensing-journals."

The object of my invention is to provide convenient means for condensing the totals of various books into one debit and one credit to the respective impersonal accounts in the private ledger.

The invention has for its object, further, to provide suitable sheets or leaves ruled to permit separate account-columns corresponding to the impersonal accounts of the various books, such as "cash-book," "stock-book," "bank-book," &c.

To those skilled in the art of keeping books other objects and advantages resulting from this arrangement and system will become apparent in the course of the following description.

In the drawings, Figure 1 is a view of the book open with the corner of the narrow leaf turned back, exposing some of the account titles and postings on the succeeding wide leaf of the book and also showing a portion of the blank edge of the narrow leaf. Fig. 2 is a view showing the book open with the edge of the short leaf flat. Fig. 3 is a similar view with the edge of the short leaf folded to bring the postings thereon in line with the postings on the opposite side of the short leaf and face of the succeeding wide leaf, and Fig. 4 is an end elevation of the book more clearly showing the alternate wide and narrow leaves and the folding feature of the narrow leaves.

As shown in Fig. 1, I have arranged in a vertical column *a* to the left of the first wide page *b* the titles of the various impersonal accounts, such as "Capital stock," "Stockholders," "Dividends," "Cash," "Petty cash," &c. To the right of this vertical-column are arranged a series of narrow vertical columns adapted to receive debit-postings, dollars and cents, of the various impersonal accounts in the private ledger corresponding to the accounts in the first or title column. These narrow columns extend across the wide leaves *b* and narrow leaves *c* and are continued on the opposite side of the narrow leaf, as clearly shown in Figs. 2 and 3, and across the face of the succeeding wide leaf, and said columns may be equal in number to the titles of accounts in the title-column. The last column on the narrow page (designated by the letter *d* and headed "Semitotal") is for the purpose of posting the semitotal credits, and the last column on the wide page (indicated by the letter *e* and headed "Total") is for the sums of the various sum-total credits appearing in the column *d* and the total credits of the accounts that follow.

The totals of the debits are at the bottom of the pages beneath the title of each amount, as shown, and to further illustrate take, for instance, the "cash account" in the title-column opposite which in the column allotted to "bank" I post "$24,956.06," which indicates that "bank" is debtor to "cash" in the sum stated and at the same time "cash" is creditor to "bank" in a like sum. Further, "$225" is posted under "petty cash," "$2,132.80" under "bills receivable," and "$8,962.15" under "sundry creditor," "$4,613.21" under "internal revenue," which, together with "$1,019.15" posted under "custom duty" and opposite cash, aggregates "$41,968.37," which is the sum-total credit.

In order that the invention may be clearly understood, I have avoided the use of numerous postings and omitted postings from the opposite side of the narrow leaf as it appears in Fig. 1, although it will be understood that postings are placed under the titles of the various accounts on this side of the narrow leaf when necessary. As shown in Figs. 1, 2, and 3, a posting of "$250" appears under "loss and gain" and opposite "cash," which amount, together with the amount appearing in the semitotal-column *d*, aggregates "$42,298.37," which appears in total-column *e*. In Fig. 3 the foldable edge *f* of the narrow leaf is shown folded on the line *xx*, which brings the posting thereon in line with all of the postings opposite "cash," which may appear on the side of the narrow leaf opposite to that on which the postings "$8,965.15," "$4,613.21," &c., appear, as well as opposite the postings that appear on the face of the succeeding wide leaf, which in the present instance is "$250" under "loss and gain."

The alternate arrangement of the wide and narrow leaves makes it possible to deal with a great number of account-titles with a book of convenient size, as the surface of virtually four leaves is utilized for the columns devoted to the various accounts. The feature of allotting the space of the narrow leaves so that their edges are adapted to be turned over or folded to bring the semitotal-postings thereon in line with other postings in a particular account-title and keep the semitotal-postings always in sight, thus rendering it unnecessary to be continually turning back the narrow leaves, is very important and adds greatly to the convenience of adding the various postings to get the grand-total credit of any particular account.

As shown at g, Figs. 1 and 2, the edge of the narrow leaf opposite the semitotal-column is left blank for double the width of the semitotal-column, so that when said column is turned back, as in Fig. 3, nothing will be obscured. Further, it will be noted that when the narrow leaf and its edge is turned, as in Fig. 3, the semitotal-column thereon will be brought opposite its proper account in the account-title column and at the same time opposite the other postings under various accounts on the opposite side of the narrow page and face of the succeeding wide page. By this arrangement it will be readily seen that an immense amount of labor in keeping books will be saved, and the convenience in reference will be very considerable.

I claim—

1. A condensing-journal comprising wide and narrow leaves arranged alternately, title-columns on the left side of the wide leaves, vertical columns extending across the faces of the wide leaves, the narrow leaves and opposite sides of the narrow leaves onto the faces of the succeeding wide leaves and provided with headings corresponding to the titles in the title-columns, appropriately headed semitotal-columns on the edges of the narrow leaves, foldable for the purpose set forth, and appropriately-headed grand-total columns at the edges of the side leaves.

2. A condensing-journal consisting of alternate wide and narrow leaves, title-account columns on the left sides of the wide leaves, vertical columns extending across the faces of the wide leaves, the narrow leaves and opposite sides of the narrow leaves and onto the faces of the succeeding wide leaves, said vertical columns being provided with headings corresponding with the account-titles in the account-title column, and arranged in the same order, appropriately-headed grand-total columns at the edges of the wide leaves, appropriately-headed semitotal-columns at the edges of the narrow leaves, said columns being adapted to be folded to bring the postings therein in horizontal alinement with the account-titles and at the same time opposite the posting under the various headings in the vertical columns, so that the posting in any column will represent a debit of the account under which it appears, and a credit of the account opposite which it appears.

In testimony whereof I affix my signature in the presence of two witnesses.

RUDOLPH F. HEILES.

Witnesses:
ROBERT UNGER,
HENRY HEINEMANN.